(12) United States Patent
Schreib et al.

(10) Patent No.: US 6,377,797 B1
(45) Date of Patent: Apr. 23, 2002

(54) ARRANGEMENT FOR DATA PROCESSING

(75) Inventors: Franz Schreib; Lutz Finn, both of Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/203,717

(22) Filed: Dec. 2, 1998

(30) Foreign Application Priority Data

Dec. 2, 1997 (DE) .......................................... 197 53 490

(51) Int. Cl.⁷ ................................................ H04M 3/00
(52) U.S. Cl. ......................... 455/418; 455/418; 375/219
(58) Field of Search ............................... 455/418, 517, 455/403, 428, 445, 560, 557; 370/464, 465, 489, 493; 375/219, 220, 225

(56) References Cited

U.S. PATENT DOCUMENTS

| | | | | |
|---|---|---|---|---|
| 5,438,569 A | * | 8/1995 | Kapadia et al. | 370/79 |
| 5,931,679 A | * | 8/1999 | Funahashi | 434/307 |
| 6,085,089 A | * | 7/2000 | Emmer et al. | 455/439 |
| 6,104,928 A | * | 8/2000 | Waugh | 455/445 |
| 6,122,260 A | * | 9/2000 | Liu et al. | 370/280 |
| H1895 H | * | 10/2000 | Hoffpauir et al. | 455/433 |
| 6,128,513 A | * | 10/2000 | Faerber | 455/561 |
| 6,138,020 A | * | 10/2000 | Galyas et al. | 455/436 |
| H1920 H | * | 11/2000 | Xu et al. | 455/403 |
| 6,173,177 B1 | * | 1/2001 | Lu et al. | 455/428 |
| 6,205,522 B1 | * | 3/2001 | Hudson et al. | 711/147 |

FOREIGN PATENT DOCUMENTS

DE    44 16 407 C2    11/1995

* cited by examiner

*Primary Examiner*—William Trost
*Assistant Examiner*—Congvan Tran
(74) *Attorney, Agent, or Firm*—Schiff Hardin & Waite

(57) ABSTRACT

A number of data processors, that each contain at least one processor, a memory and an interface, are provided in the inventive arrangement. The arrangement further comprises at least one digital transmitter that is connected to the data processors via a program bus and sends program code over the program bus, only parts thereof being stored in a respective data processor. The arrangement is particularly suited for transcoder units in mobile radiotelephone systems wherein a number of encoding methods are utilized or a switching in the sense of an adaptive multi-rate encoder ensues.

10 Claims, 4 Drawing Sheets

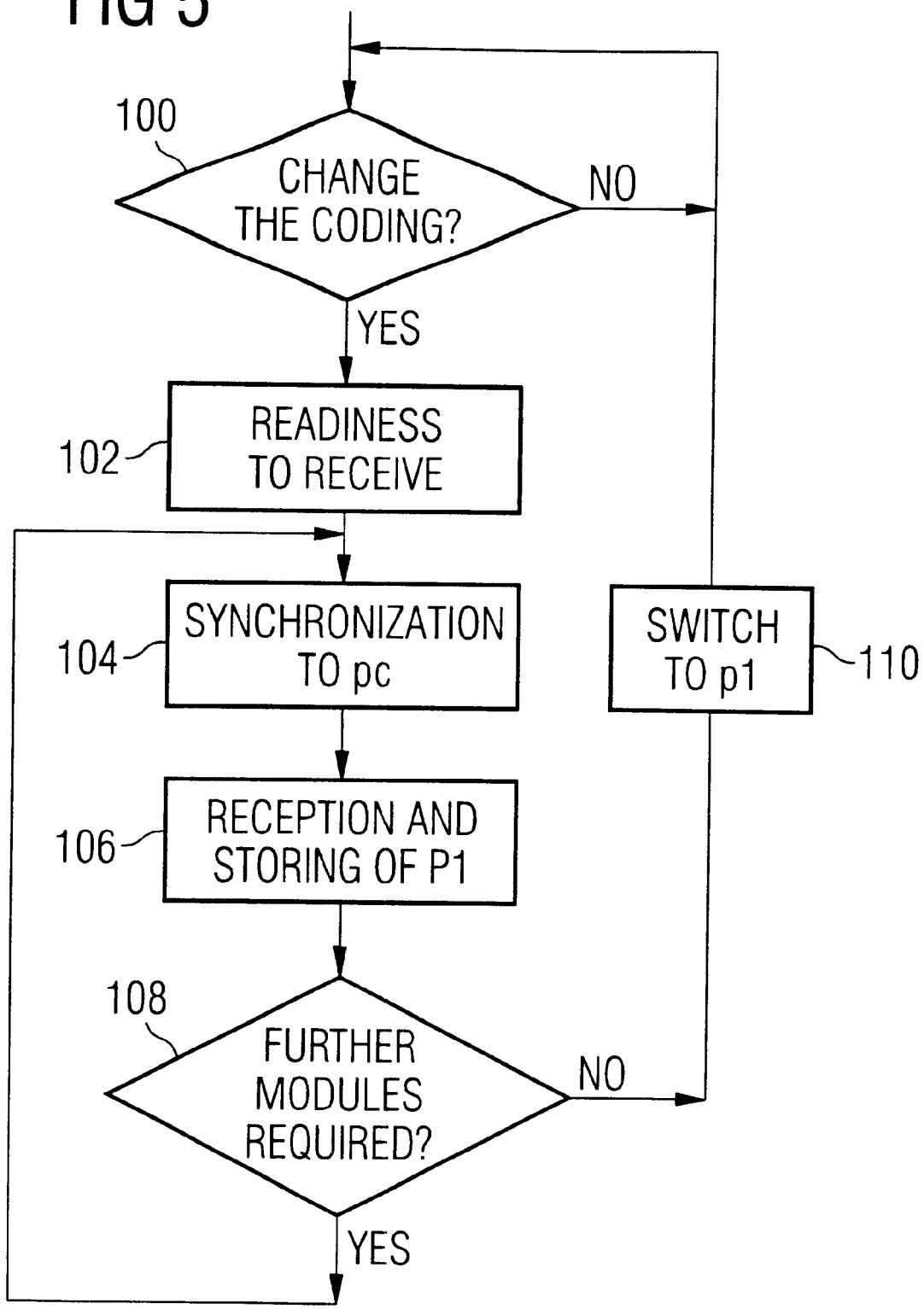

ARRANGEMENT FOR DATA PROCESSING

BACKGROUND OF THE INVENTION

1. Field of the Invention

The present invention is directed to an arrangement for data processing and more particularly to an arrangement for data processing in transcoder units of mobile radiotelephone systems.

2. Description of the Prior Art

The cellular mobile radiotelephone system GSM (Global System for Mobile Communication) is an example of a digital mobile radiotelephone system. The multiple access method TDMA (Time-Division Multiple Access) is used in this system, whereby mobile stations are distinguished from one another by different time slots of a time-division multiplex system.

FIG. 1 shows a block circuit diagram of such a mobile radiotelephone system 10 whose coverage area is divided into a number of cells. A telecommunication service from and to a mobile stations MS in a cell is offered by a base station BS. One or more base stations BS are connected to a base station controller BSC. The base station controller BSC implements the local functions of call switching, monitoring and maintenance. A number of base station controllers BSC are connected to a switching center MSC.

Given a transmission of voice to or from a mobile station MS, it is notoriously known to sample analog voice information at the transmission side and to convert the sampled analog voice information into digitally encoded voice information in a voice encoder and to transmit this digitally encoded voice information error-protected as warranted. At the reception side, the digitally encoded voice information is then converted into analog voice information.

In the aforementioned GSM mobile radiotelephone system 10, which only serves below to illustrate the technological background of the invention without limiting the universality of its employment, the transcoder unit TRAU (Transcoding and Rate Adaptation unit) implements the adaptation of the data rate that is communicated from a telephone network PSTN to the data rate defined in the mobile radiotelephone system.

The transcoder unit must implement the encoding for a number of channels and is modularly constructed as an arrangement for data processing. A number of data processors implement the encoding and rate adaptation in parallel, whereby individual memories keep the program code for the encoding on hand. For 120 channels, for example, this means that the program code is stored 120 times per transcoder unit. The arrangement for data processing therefore requires a great number of memories, each incurring corresponding costs.

Further, when various encoding methods are employed, the corresponding program code must additionally be stored for each encoding method.

SUMMARY OF THE INVENTION

An object of the present invention is to provide an arrangement for data processing wherein the memory requirement is reduced.

A number of digital data processors that each contain at least one processor, a memory, and an interface are provided in the inventive arrangement for data processing. Further, the arrangement employs at least one digital transmitter that is connected to the data processors via a program bus and sends program code, of which only parts are stored in a respective data processors, over the program bus.

A continuous transmission of program code assures that the program parts required at the moment and that are used for the data processing are always present in the data processors even without continuous storage of the entire program code. These program parts can be individually received and stored in each of the data processors. The memory requirement, thus, is reduced according to the functions to be implemented at the time, since program parts that are not required can be overwritten.

The transmission of the program code makes it possible to connect to a number of data processors that are not limited in advance to the program bus. This simplifies the subsequent upgrading of the arrangement for data processing. The introduction of new programs is also facilitated by the inventive arrangement since the data processors are always prepared for a software update.

In an exemplary embodiment of the invention, the memory advantageously employs both a program memory and a data memory. As a result of separating program memory, which stores the program parts received by the interface, and data memory, the data processing can be implemented separately from the updating of program code. The overall arrangement for data processing becomes more flexible as a result thereof.

In a further exemplary embodiment of the invention, the data processors are advantageously configured as digital signal processors. The inventive arrangement reduces the cost problems typically associated with the parallel processing of large datasets in signal processing, by requiring less memories. When the data processing relates to an encoding/decoding or rate adaptation that is subject to constant modifications as in, for example, adaptive multi-rate encoders, then the transmission of the program code and the need-suited reception effects further essential savings. The invention, however, can also be employed in other data processing equipment.

According to this exemplary embodiment of the invention, when the digital data processors undertake connection-related encoding or decoding, then individual adaptations of the program code for each and every individual data processor are possible, which permits the saving of memory space. Memory space can be saved, for example, in transcoder units in mobile radiotelephone systems that process a number of data channels in parallel and individually.

In a further exemplary embodiment of the invention, the data rate of the program code transmission is set to a frame structure of a parallel information transmission. Since new algorithms are not needed at random points in time but at points in time to be predicted according to the frame structure, a correspondingly high data rate of the program code transmission assures that every potentially required part of the program code can be loaded within a cycle of the frame structure or a multiple thereof.

In a further exemplary embodiment of the invention, the storing of the various parts of the program code initiates either a connection-related encoding method for updating of a program structure or a connection-related switching between encoding methods. The program code is thus not stored in reserve but only in preparation for a modification of the current data processing.

DESCRIPTION OF THE DRAWINGS

FIG. 5 is a program flowchart of the program code transmission in accordance with the invention.

DESCRIPTION OF THE PREFERRED EMBODIMENTS

Figure 1:
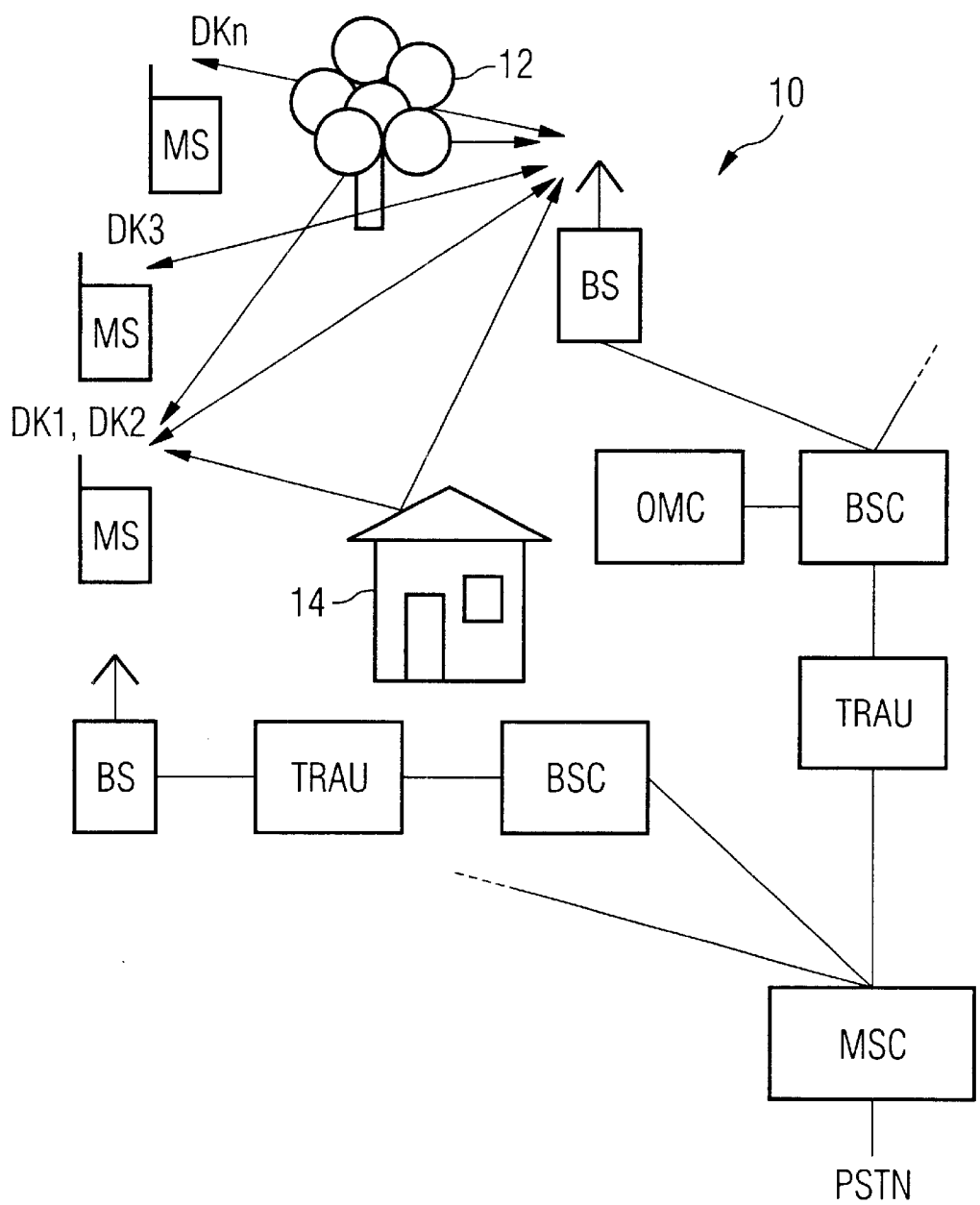
FIG. 1 is a block diagram of a mobile radiotelephone system.

In FIG. 1, the radio communication system 10 corresponds in structure to a known GSM mobile radiotelephone network that is composed of a number of mobile switching centers MSC that are networked with one another and provide access to a public switched telephone network PSTN. Further, these mobile switching centers MSC are connected via a transcoder unit TRAU to at least one base station controller BSC. Each base station controller BSC in turn enables a connection to at least one base station BS. Such a base station BS is a radio station that can set up a radio connection to mobile stations MS via a radio interface. The totality of base stations BS, the base station controller BSC and the transcoder units TRAU is also referred to as base station system BSS.

By way of example, FIG. 1 shows three radio connections for the transmission of message information and signalling information between three mobile stations MS and a base station BS, whereby two data channels DK1 and DK2 are allocated to one mobile station and one data channel DK3 or DKn is allocated to the other mobile stations MS. Each data channel DK1 . . . DKn represents a subscriber signal for voice information and/or data. Object 12 and structure 14 represent objects located between the mobile station MS and a base station BS.

An operations and maintenance center OMC realizes administration and maintenance functions for the mobile radiotelephone network or for parts thereof The functionality of this structure is utilized by the radio communication system 10 of the invention; however, it can also be transferred to other radio communication systems in which the invention can be utilized.

The adaptation of the data of the mobile radiotelephone network to a telephone network is implemented by the transcoder unit TRAU. The public switched telephone network PSTN can thereby be fashioned as ISDN network, as another mobile radiotelephone network or as some other telephone or data network. In this realization, the transcoder unit TRAU is arranged between mobile switching center MSC and base station controller BSC. Alternatively, however, it can also be arranged between base station controller BSC and base station BS. Spatially, the transcoder unit TRAU is an independent unit that can also be combined with the mobile switching center MSC, the base station controller BSC or the base station BS.

Frames whose data symbols are transmitted in a continuous data flow from the transmission side to the reception side are employed for the information transmission between the transcoder unit TRAU and a base station BS. At the reception side, a synchronization to a frame is implemented in that a known sequence of data symbols is sought and the frame beginning is recognized when it is found. A switching between various encoding or adaptation methods is oriented on this frame structure.

The interface between base station BS and base station controller BSC is referred to as Abis interface and the interface between base station controller BSC and transcoder unit TRAU is referred to as Asub interface. The transmission ensues wire-bound via a PCM24 or a PCM30 link. A PCM 30 link has a transmission rate of 2 Mbit/s (30 channels, each with 64 Kbitsec), as supplied from the public switched telephone network PSTN to the transcoder unit TRAU. Further, the transcoder unit TRAU can have a sub-multiplexing function, so that up to 4 traffic channels each having 16 Kbit/s can be administered on a 64 Kbit/s line.

The functioning of the voice encoding and decoding as well as of the voice transmission can be derived from German Letters Patent 44 16 407. On the one hand, the frames transport the voice-encoded voice information and, on the other hand, they contain control signals that provide information about the condition of the contained voice data, so that the data can be handed over to the appertaining voice processing functions in the transcoder unit TRAU. Instead of the voice information, the frames can also contain data, for example for a fax service or some other service realized by a modem.

Figure 2:
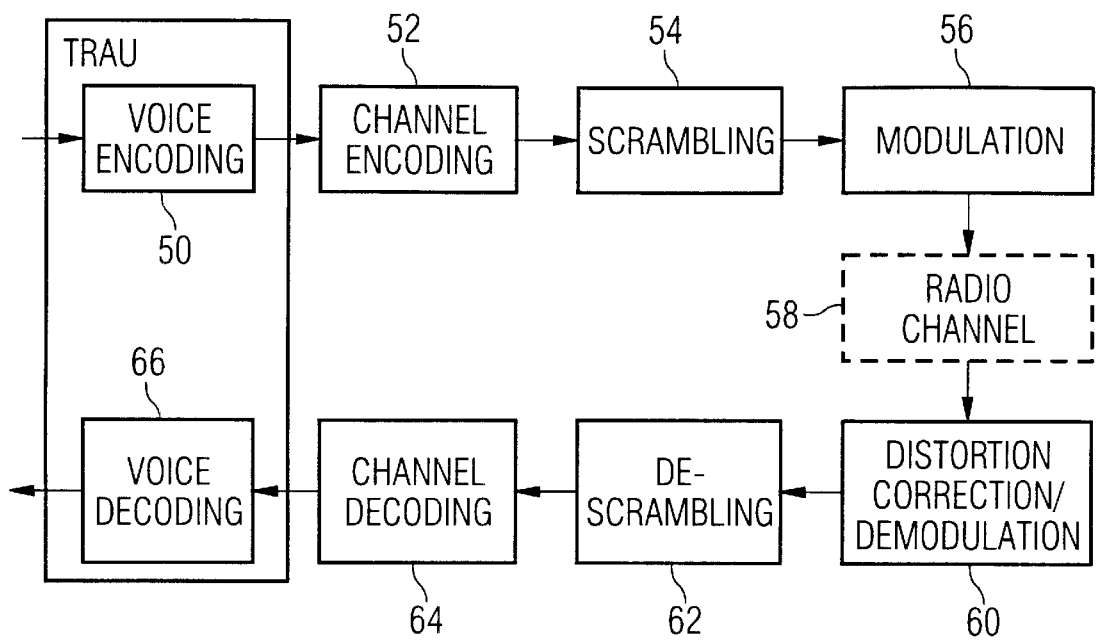
FIG. 2 is a block diagram of a message transmission in a mobile radiotelephone system in accordance with the invention.

According to FIG. 2, a voice signal, for example in the PCM format with 64 Kbit/s, is subjected to a voice encoding 50 to, for example, 13 Kbit/s. Subsequently, a channel encoding 52 ensues, whereby especially important bits for the voice quality are especially protected by the channel encoding 52. Redundancy is added to the voice signal by the channel encoding 52, so that, for example, a channel-encoded voice signal with 22.8 Kbit/s is present.

In the GSM mobile radiotelephone system 10 (FIG. 1), the information is transmitted by radio blocks, i.e. it is not a continuous information transmission but a block-by-block transmission. Since disturbances are often of only a short duration, a scrambling 54 of the information between a plurality of radio blocks of a communication connection additionally occurs. A protection against what are referred to as bust-like disturbances is thus possible. Subsequently, the data is also modulated 56, whereby GSMK (Gaussian minimum shift keying) modulation is utilized in the GSM mobile radiotelephone system 10 (FIG. 1).

Since a cornmunication-oriented presentation and not a radio-oriented presentation was selected in the block circuit diagram of FIG. 2, details of the radio-frequency radio transmission 58, the amplification at the transmission side 58, and the processing and baseband conversion at the reception 58 that are known to a person skilled in the art are not shown in detail. A distortion correction and demodulation 60 occurs in the reception means with the reception signals converted into the baseband. As a result of this processing step, detected symbols are present that are subsequently descrambled 62 corresponding to the transmission side and are channel decoded 64. A voice decoding 66 also subsequently ensues for the reconstruction of the voice signals.

The transcoder unit TRAU thereby implements the functions of the voice encoding 50 or voice decoding 66.

Figure 3:
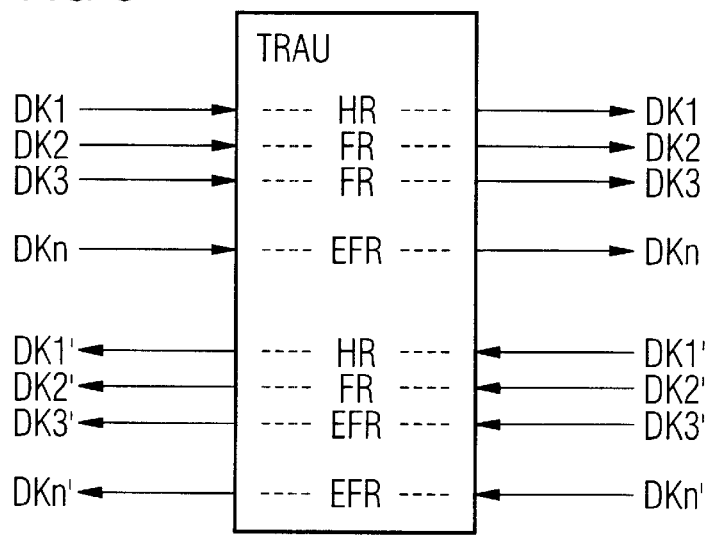
FIG. 3 is a block diagram of a transcoder unit having a number of data channels to be processed in parallel in accordance with the invention.

The transcoder unit TRAU of FIG. 3 contains a number of transcoders (not shown) that, for the transmission to the base station BS, undertake a conversion of the information incoming frame-by-frame from the public switched telephone network for each data channel DK1 through DKn and DK1' through DKn' . The transcoder unit TRAU represents the reception side for frames arriving from the base station BS, whereby a conversion of the frames into a corresponding message ensues for the transmission to the mobile switching center MSC.

A bidirectional data channel normally exists for voice connections, whereby channel pairs DK1 and DK1' , etc., arise in FIG. 3. Different encoding methods are employed for these data channels, for example half-rate HR, full rate FR or what is referred to as enhanced fuill rate encoding methods EFR. One of these encoding methods is selected according to the transmission conditions and the capabilities of the mobile station MS. The different encoding methods can thereby also be part of a multi-rate encoder.

Usually, the same encoding method is employed in both transmission directions for a connection. This, however, is not compulsory. An individual encoding method can also be applied in both directions (see data channels DK3 and DK3'). When a plurality of unidirectional connections exist, for example data services, then individually adapted encoding methods are also selected for these.

Figure 4:
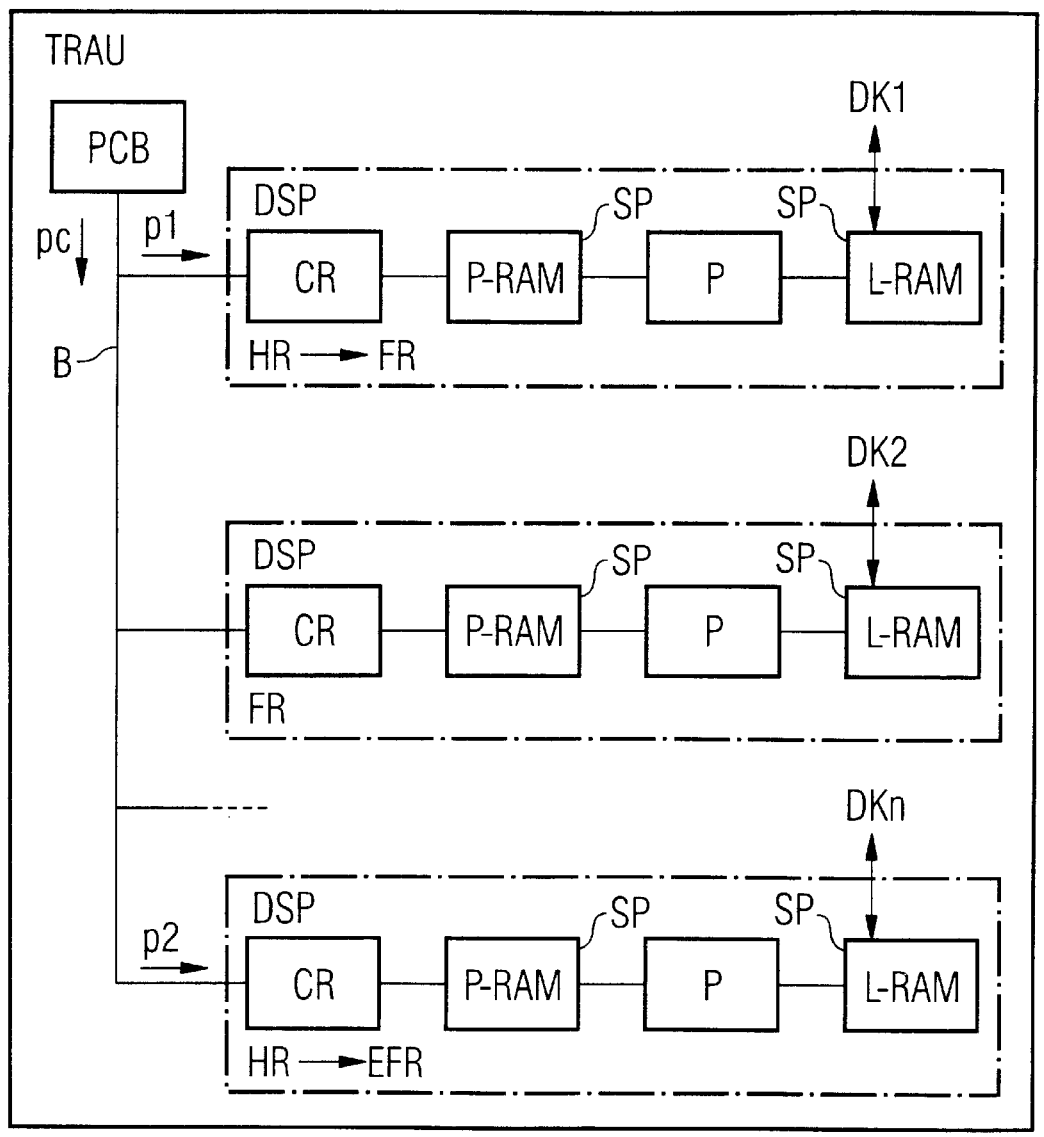
FIG. 4 is a block diagram of a program code transmission within a transcoder unit in accordance with the invention.

FIG. 4 shows a portion of a transcoder unit TRAU that represents an arrangement for data processing. The transcoder unit TRAU contains a number of digital data processors DSP. The data processors DSP are fashioned as digital signal processors that contain at least one processor P, a memory SP formed of program memory P-RAM and of a data memory L-RAA, and also contain an interface CR. The processor P implements the encoding/decoding in that it accesses the algorithm stored in the program memory P-RAM and the data to be encoded/decoded that is stored in the data memory L-RAM.

The data processors DSP are connected to a digital transmitter PCB (program code broadcaster) via a program bus B. Further devices of the transcoder unit TRAU, including a data bus for the data channels DK1, DK2, DKn, are not shown. Program code pc sent by the digital transmitter PCB is transmitted on the program bus B and can be received by the interface CR and stored in the program memory P-RAM.

Only the program parts p1, p2 of the program code pc that are required for immediate encoding/decoding are stored. Thus, the data processor DSP receives the part p1 for the first data channel in order to be able to switch from the half-rate encoding HR to the fill rate encoding FR. The $n^{th}$ data processor DSP for the $n^{th}$ data channel DKn receives the part p2 for switching from the fill rate encoding FR to the enhanced full rate encoding EFR.

In this example, the program code pc is composed of part p1 for the full rate encoding FR, part p2 for the enhanced fill rate encoding EFR and part p3 for the hal-frate encoding FR [sic]. Only approximately one-third of the memory requirement for the entire program code pc, for example only 20 Kwords instead of 64 Kwords, thus has to be provided in the program memories P-RAM of the data processors DSP.

Assuming a memory of the digital transmitter PCB, which is likewise fashioned as signal processor, has an access time of 10 ns and the program bus B has a width of 16 bits, then 100 million words (16 bit) can be transmitted per second. When the algorithm of a voice encoder requires 20 kwords, then the algorithms for five encoders are available in 1 ms. Given a duration of 20 ms for a frame of the voice transmission and approximately 100 MIPs for the digital signal processors, a switching between the frames is also possible. Given a lower data rate on the program bus, a switching can only ensue after a frame length or a multiple of a frame length. It is likewise possible to allow the switching at arbitrary points in time, whereby a frame is then lost for the transmission. stored in the program memory P-RAM and the data to be encoded/decoded that is stored in the data memory L-RAM.

The data processors DSP are connected to a digital transmitter PCB (program code broadcaster) via a program bus B. Further devices of the transcoder unit TRAU, including a data bus for the data channels DK1, DK2, DKn, are not shown. Program code pc sent by the digital transmitter PCB is transmitted on the program bus B and can be received by the interface CR and stored in the program memory P-RAM.

Only the program parts p1, p2 of the program code pc that are required for immediate encoding/decoding are stored. Thus, the data processor DSP receives the part p1 for the first data channel in order to be able to switch from the half-rate encoding HR to the fill rate encoding FR. The $n^{th}$ data processor DSP for the $n^{th}$ data channel DKn receives the part p2 for switching from the fill rate encoding FR to the enhanced full rate encoding EFR.

In this example, the program code pc is composed of part p1 for the full rate encoding FR, part p2 for the enhanced fill rate encoding EFR and part p3 for the hal-frate encoding FR [sic]. Only approximately one-third of the memory requirement for the entire program code pc, for example only 20 Kwords instead of 64 Kwords, thus has to be provided in the program memories P-RAM of the data processors DSP.

Assuming a memory of the digital transmitter PCB, which is likewise fashioned as signal processor, has an access time of 10 ns and the program bus B has a width of 16 bits, then 100 million words (16 bit) can be transmitted per second. When the algorithm of a voice encoder requires 20 kwords, then the algorithms for five encoders are available in 1 ms. Given a duration of 20 ms for a frame of the voice transmission and approximately 100 MIPs for the digital signal processors, a switching between the frames is also possible. Given a lower data rate on the program bus, a switching can only ensue after a frame length or a multiple of a frame length. It is likewise possible to allow the switching at arbitrary points in time, whereby a frame is then lost for the transmission.

We claim as our invention:

1. An arrangement for data processing comprising:
    at least one data processor, said at least one data processor including
        at least one processor,
        a memory, and
        an interface;
    a program bus connected to said interface; and
    at least one digital transmitter connected to said at least one data processor via said program bus, said digital transmitter continuously sending program code over said program bus to said at least one data processor with only parts of said program code being respectively selected by said at least one data processor and stored in said memory of said at least one data processor.

2. An arrangement for data processing as claimed in claim 1 wherein said memory includes a program memory and a data memory.

3. An arrangement for data processing as claimed in claim 1 wherein said at least one data processor is a digital signal processor.

4. An arrangement for data processing as claimed in claim 1 wherein said at least one data processor is configured as an encoder and decoder.

5. An arrangement for data processing as claimed in claim 4 wherein said at least one data processor is configured as a connection-related encoder and decoder.

6. An arrangement for data processing as claimed in claim 4 wherein said at least one data processor is a transcoder unit of a mobile radiotelephone system.

7. An arrangement for data processing as claimed in claim 1 wherein said at least one digital transmitter sends program code over said program bus at a data rate which corresponds to a frame structure of a parallel information transmission.

8. An arrangement for data processing as claimed in claim 5 wherein said interface is configured for connection-related encoding and decoding.

9. An arrangement for data processing as claimed in claim 5 wherein said interface is configured for connection-related switching between half-rate encoding, full-rate encoding, and enhanced fill-rate encoding.

10. An arrangement for data processing as claimed in claim 1 wherein said at least one digital transmitter is configured to continuously send program code over said program bus to said at least one data processor.

* * * * *